Patented June 3, 1941

2,244,325

UNITED STATES PATENT OFFICE 2,244,325

COLLOIDAL SOLUTIONS OF INORGANIC OXIDES

Paul G. Bird, Western Springs, Ill.

No Drawing. Application April 15, 1940,
Serial No. 329,729

9 Claims. (Cl. 252—313)

The present invention relates to an improvement in the manufacture of highly reactive colloidal solutions of inorganic oxides.

One of the primary objects of the present invention is the production of colloidal solutions of inorganic oxides which are normally considered as being substantially insoluble in water. These oxides may be metallic, nonmetallic or those of an element that has properties intermediate those of metals or nonmetals. In essence, the invention is concerned with the treatment of a soluble salt, the anion of which consists of oxygen and another element, the latter being in a state of oxidation in which it is predominantly acid, and the acid and oxide of which are relatively insoluble.

The underlying principle upon which the present invention is predicated involves the passage of a solution of an alkali compound of an element over an acid-regenerated zeolite or exchange material whereby the alkali is substantially removed from the compound, leaving the oxide of the element in solution in the colloidal state. After the zeolitic material has adsorbed its quota of alkali, it can be restored or regenerated by the expedient of passing an acid solution over it, thereby forming a soluble alkali compound, which may then be washed from the zeolitic material, whereafter the latter may be employed for treating new amounts of the alkali compound of the said element or other analogous compound or compounds.

The term "zeolite" is used in the present connection in its generic sense of any exchange material, be it either natural or synthetic, inorganic or organic in nature.

The present invention, as will be shown in greater detail hereinbelow, may be applied to a large number of substances, and is generic in its nature. Thus it may be applied to the production of colloidal solutions of silica (silicon dioxide, $SiO_2$), tungstic acid, molybdenum trioxide, antimonic acid, vanadium oxide or vanadic acid, germanium oxide, and the like. For instance, a solution of sodium silicate may be passed through, or otherwise contacted with, a mass of acid-regenerated zeolite, resulting in the adsorption of the sodium ion from the sodium silicate by the zeolite, yielding a colloidal solution of silicon dioxide (silica, $SiO_2$).

The invention may with great advantage be applied to the production of a highly reactive colloidal solution or aqueous dispersion of silica, $SiO_2$, probably in the form of $Si(OH)_4$, with, however, a small residuary amount of an alkali metal such as, for example, sodium, but in which the ratio of $SiO_2$ to $Na_2O$ is at least 10:1 and may be as high as 100:1 but preferably is about 50:1.

A further object of the invention is to produce, in accordance with the broad principles of the invention, a coagulant or reagent which may be employed, for example, for the treatment of water, particularly for clarification of turbid water, sewage effluents, and the like, consisting of a colloidal dispersion of silica having a concentration of from 5% to 15% of $SiO_2$ kept in solution by a very small amount of sodium hydroxide.

A further, and more specific, object of the invention is a process for producing a colloidal silica solution by passing a dilute alkali silicate solution through a mass or bed of a zeolite or ion-exchange material for the purpose of removing from the silicate solution the alkali metal ions as far as possible, so that the effluent from the process will contain a large proportion of colloidally dispersed $SiO_2$, only a small amount of alkali metal hydroxide, and very little, if any, other ions or electrolytes. It has been found that to carry out the present invention it is particularly advantageous to employ for that purpose a carbonaceous zeolite; that is to say, ion-exchange materials derived from, for example, cellulosic material such as wood which has been treated with concentrated sulfuric acid under conditions conducive to the production of a material having high exchange properties. Such materials are sufficiently well known in the art of making exchange materials to require no further description herein. These carbonaceous exchange materials will exchange metallic ions such as sodium or potassium ions from a dilute solution of a silicate, leaving the silica itself remaining in the water in the form of what is believed to be a colloidal solution. After the carbonaceous zeolite has been exhausted of its exchange properties it is capable of being restored to substantially its original activity by appropriate treatment with an acid in accordance with the manner hereinafter described. It is, of course, possible to use any other kind of zeolite which has the capacity of taking up metallic ions. The primary object of employing a zeolite is to remove the alkali ions, such as the sodium ions, from an alkali silicate such as, for example in this instance, sodium silicate.

In one of its preferred embodiments the present invention comprises diluting a commercially obtainable sodium silicate solution to about one-tenth of its original concentration and then passing the diluted solution through a mass or bed of an appropriate zeolite, collecting the effluent in a tank or reservoir and continuing the process until toward the end of the operation the effluent from the zeolite bed begins to react decidedly alkaline. The combined effluent is titrated from time to time with acid until it reaches a predetermined alkalinity, whereupon the process is stopped and the entire collected effluent is either sold as such or further concentrated, as by evaporation. Thereafter the zeolite is regenerated to be made ready for further use.

Purely as an exemplification of the present invention and without in any way intending to limit it thereby, details of a commercially feasible operation for the production of a colloidal silica solution will now be presented. For example, 27.5 gallons of what is known as "JM brand" sodium silicate are diluted with water to form a total of 275 gallons of solution. The JM brand sodium silicate has a density, at room temperature, of 42° Baumé, which is equal to a specific gravity of 1.417 at 70° F. and contains approximately 29.6% of silica and about 9% of alkali calculated as sodium oxide, $Na_2O$. In other words, it is, roughly, a 30% solution expressed as $SiO_2$. The diluted solution therefore will contain one-tenth, or approximately 3%, of $SiO_2$. The material is, of course, not present at that stage as actual $SiO_2$, nor is the alkali there as actual $Na_2O$, the two materials undoubtedly being in combination in the form of a complex silicate or silicates, but it has been customary in this art to express the compositions of these silicate solutions in terms of the ratio between the silica $SiO_2$ and the alkali as sodium oxide or $Na_2O$. In this particular brand of silicate the ratio is $SiO_2:Na_2O=3.3:1$. This ratio is, of course, not at all disturbed by the dilution of the solution. This dilute solution is then passed through an acid-regenerated bed of a carbonaceous zeolite composed of, for example, 20 cubic feet thereof, the rate of passage being approximately one gallon per square foot per minute. The effluent is collected in a large container until the alkalinity of the entire amount of collected material, as measured by titration thereof with acid to the methyl orange end point, reaches from 60 to 75 grains per gallon calculated as $CaCO_3$, at which time the further flow of solution through the carbonaceous zeolite is stopped. The resultant solution will then have a silica content of about 3 to 3.5%, which is the same as it was before, but practically all of the $Na_2O$ content will have been retained by the zeolite.

In order to reduce the amount of liquid which is to be sold and shipped, it has been found advantageous to evaporate the total effluent, preferably in a vacuum evaporator, to about one-half its original bulk, which therefore raises its silica content to about 6 to 6.5%. A typical analysis of the silica solution prepared according to the just mentioned example is about 6.5% $SiO_2$ and 0.13% $Na_2O$, which has a ratio of $SiO_2$ to $Na_2O$ of exactly 50:1. In other words, there is about fifteen times as much silica per unit of sodium oxide in the finished product as there was in the original sodium silicate solution.

While it is desirable to remove as much of the alkali as possible, a very small amount of it should be allowed to remain in the product, as it greatly enhances its keeping qualities, preventing it from congealing or gelling.

It is possible to produce solutions containing a ratio of $SiO_2$ to $Na_2O$ of as high as 100:1, but for commercial purposes a ratio of 50:1 is quite satisfactory.

After the passing of the sodium silicate solution through the zeolite has been stopped, the zeolite is regenerated as follows: It is first backwashed with plain water to wash therefrom the thereto adhering sodium silicate and is then treated with a dilute solution of sulfuric acid, using about 3 pounds of 66° Baumé sulfuric acid per cubic foot of zeolite, whereafter the acid is removed and the zeolite washed with water to remove the excess acid and the sodium sulfate which has been formed as a result of the action of the acid upon the zeolite. After the acid has thus been washed out, the zeolite is ready to be used for the production of a further batch of silica solution of the present invention. The sulfuric acid is preferably used in a concentration of about 4% of actual $H_2SO_4$.

During the first part of the operation the effluent flowing from the zeolite is practically neutral in reaction and contains only a very small amount of sodium or other alkali ion, and it is within contemplation of the invention to segregate this first portion to form a particularly pure form of the product of the present invention. In this product the ratio of $SiO_2$ to $Na_2O$ may be as high as from 75 to 100:1.

When such a colloidal silica solution is employed, for example, as a coagulant for turbid waters, sewage effluents, factory waste waters, etc., a solution of a ratio of about 50:1 has been found to be quite satisfactory and sufficiently inexpensive to warrant large-scale use.

The appearance of the colloidal silica solution of the present invention is a relatively clear solution, although it may possess a slight turbidity. It is practically free of chlorides and contains but a very slight amount of sulfate ion, and the only electrolytes present in substantial amounts are residual sodium silicate and a small amount of sodium hydroxide.

If ordinary non-carbonaceous zeolites are employed for this purpose, the regeneration with acid must be accomplished with care in order to avoid destroying the zeolite. It is, of course, obvious that the sulfuric acid described in the particular example of regeneration may be replaced by any other acid, such as a mineral acid or an organic acid. Suitable acids are hydrochloric acid, nitric acid, acetic acid, oxalic acid, etc. It will, of course, also be possible to start with some other alkali silicate, such as potassium silicate, lithium silicate, etc., although, obviously, these would be very much more expensive and hence, from a commercial point of view, not as desirable; but the invention is not limited to any particular alkali silicate, nor to any particular zeolite, nor to any particular acid for regeneration of the zeolite.

The colloidal silica solution thus prepared forms an excellent coagulant for water and sewage treatment.

When applying the present invention to the preparation of other colloidal oxide or acid solutions, the procedure is quite similar. As further examples, the following are cited:

A solution of sodium tungstate ($Na_2WO_4.2H_2O$) was made in water solution to give a strength of sodium oxide of 0.5%. When this solution was passed through a zeolite bed which had been previously treated with acid and washed free of the acid, it was found that the effluent from the sodium tungsate solution was fluorescent under a blue light, was slightly cloudy, and had the Tyndall effect, indicating the presence of colloidal matter. When this liquid was evaporated the residue was found to consist of approximately 99% tungstic acid and 0.5% Na₂O. The effluent solution was acidic, equivalent to 96 grains per gallon in terms of calcium carbonate, whereas the influent had an alkalinity of 295 grains per gallon in terms of calcium carbonate.

Sodium molybdate ($Na_2MoO_4.2H_2O$) was made up in solution in such strength that it contained 0.5% $Na_2O$. When this was passed through an exchanger bed which had been previously treated with acid and washed free of the acid, it was found that the effluent coming through was a deep blue color, and the influent was colorless. The colloidal solution produced was perfectly clear and stable, and showed no tendency to settle out after a period of several weeks. It was concluded that a molybdenum oxide complex was probably formed. Upon evaporating the effluent the residue was found to consist of 99% molybdenum trioxide ($MoO_3$) and approximately 0.5% $Na_2O$.

In like manner potassium pyroantimonate ($K_2H_2Sb_2O_7.4H_2O$) was passed through a bed prepared as above. The alkalinity of the influent was 37.6 grains per gallon in terms of calcium carbonate, while the effluent had an acidity equivalent to 63 grains per gallon in terms of calcium carbonate. It was also found, however, due to the low solubility of this salt, that somewhat less than 0.4% sodium oxide was in the influent. The effluent was slightly fluorescent and cloudy, showed the Tyndall effect, and no settling took place on standing.

A solution of sodium vanadate was passed through a zeolite bed as described above and was found to yield a colloidal solution of vanadium oxide. The effluent was colored yellow and upon being evaporated to dryness resulted in a green powder. The colloidal solution of vanadium oxide was relatively stable.

Sodium germanate was made up into solution to contain 20 grams per liter of germanium oxide ($GeO_2$) and passed through a zeolite bed prepared as above, and the effluent was found to give the Tyndall effect, showing the presence of colloidal germanium oxide.

The colloidal solutions thus prepared are fairly stable, particularly if a small amount of alkali be allowed to remain therein. They may be employed for any purpose for which they may be suitable. When mentioning alkali, ammonium is to be considered as included. In general, the process may be said to comprise the production of a solution of the oxide of an element whose oxide is predominantly acid and hence capable of forming salt-like compounds with the alkalis.

Obvious equivalents, within the knowledge of the skilled chemist, are to be construed as within the scope and purview of the present invention, for which the inventor claims:

1. The process of producing a colloidal solution of an acidic oxide which comprises passing a solution of an alkali salt thereof through a mass of ion-exchange material which has been treated with an acidic reagent.

2. The process of producing a colloidal solution of an acidic oxide which comprises abstracting the alkali metal ions from an alkali metal compound thereof by base exchange effected by means of a zeolite which has been treated with an acidic reagent.

3. The process of producing a colloidal solution of an acidic oxide which comprises the steps of treating a carbonaceous zeolite with an acid and then contacting an aqueous solution of an alkali compound of said oxide therewith, whereby the alkali metal ions of the latter solution will be adsorbed by said zeolite, leaving the oxide in colloidal solution.

4. The process of producing a colloidal solution of silica which comprises passing a solution of an alkali silicate through a mass of ion-exchange material which has been treated with an acidic reagent.

5. The process of producing a colloidal solution of silica which comprises abstracting the alkali metal ions from an alkali metal silicate solution by base exchange effected by means of a zeolite which has been treated with an acidic reagent.

6. The process of producing a colloidal solution of silica which comprises the steps of treating a carbonaceous zeolite with an acid and then contacting an aqueous solution of an alkali silicate therewith, whereby the alkali metal ions of the silicate solution will be adsorbed by said zeolite, leaving the silica in solution.

7. The process of producing a stable colloidal solution of silica which comprises diluting an approximately 30% solution of sodium silicate having an $SiO_2$ to $Na_2O$ ratio of about 3:1 to about one-tenth of its original concentration and then passing the diluted solution through a mass of carbonaceous zeolite to abstract sodium ions therefrom, collecting the effluent and continuing passing the solution through the zeolite until the total collected effluent has an alkalinity as determined by acid titration of about 50 to 75 grains per gallon (calculated as $CaCO_3$), and then evaporating the combined effluent to about one-half of its volume.

8. A cyclic process of producing a colloidal solution of an acidic oxide which comprises passing a dilute solution of an alkali compound of an acidic oxide through a mass of an ion-exchange material to abstract alkali ions therefrom, collecting the resulting effluent, continuing the operation until the effluent contains the maximum desired alkali-ion content, then backwashing the mass of exchange material to remove the thereto adhering solution of the alkali compound of the acidic oxide and thereupon treating it with a dilute acid to regenerate its exchange power and washing is free from acid, and then again passing a dilute solution of the alkali compound of an acidic oxide through the exchange material.

9. A cyclic process for producing an aqueous solution of an inorganic acidic oxide normally insoluble in water which comprises passing a dilute solution of an alkali compound of such an oxide through a mass of ion-exchange material which has been treated with an acidic reagent so as thereby to extract alkali ions from said alkali compound, collecting the resulting effluent, continuing the operation until said effluent contains the desired alkali-ion content, then backwashing the mass of exchange material to remove the thereto adhering solution of the alkali compound of the oxide, thereupon treating it with a dilute acid to regenerate its exchange power and washing it free from acid, and then again passing a dilute solution of said alkali compound of said inorganic oxide through the exchange material.

PAUL G. BIRD.

CERTIFICATE OF CORRECTION.

Patent No. 2,244,325. June 3, 1941.

PAUL G. BIRD.

It is hereby certified that error appears in the printed specification of the above numbered patent requiring correction as follows: Page 3, second column, line 51, claim 8, for the word "is" read --it--; and that the said Letters Patent should be read with this correction therein that the same may conform to the record of the case in the Patent Office.

Signed and sealed this 15th day of July, A. D. 1941.

(Seal)

Henry Van Arsdale,
Acting Commissioner of Patents.